United States Patent
Lee et al.

(10) Patent No.: US 11,726,299 B2
(45) Date of Patent: Aug. 15, 2023

(54) OPTICAL IMAGING SYSTEM

(71) Applicant: SAMSUNG ELECTRO-MECHANICS CO., LTD., Suwon-si (KR)

(72) Inventors: Tae Youn Lee, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 84 days.

(21) Appl. No.: 17/374,415

(22) Filed: Jul. 13, 2021

(65) Prior Publication Data

US 2021/0341708 A1 Nov. 4, 2021

Related U.S. Application Data

(63) Continuation of application No. 16/375,058, filed on Apr. 4, 2019, now Pat. No. 11,092,775, which is a
(Continued)

(30) Foreign Application Priority Data

Dec. 20, 2016 (KR) .................. 10-2016-0174946

(51) Int. Cl.
*G02B 9/62* (2006.01)
*G02B 13/00* (2006.01)
(Continued)

(52) U.S. Cl.
CPC ................ *G02B 9/62* (2013.01); *G02B 9/04* (2013.01); *G02B 9/60* (2013.01); *G02B 13/0045* (2013.01); *H04M 1/0264* (2013.01)

(58) Field of Classification Search
None
See application file for complete search history.

(56) References Cited

U.S. PATENT DOCUMENTS 5,513,046 A    4/1996 Toyama
5,986,821 A    11/1999 Yoon
(Continued)

FOREIGN PATENT DOCUMENTS

CN    101387739 A    3/2009
CN    101387740 A    3/2009
(Continued)

OTHER PUBLICATIONS

Chinese Office Action dated Nov. 22, 2019 in counterpart Chinese Patent Application No. 201710351472.5 (15 pages in English and 13 pages in Korean).
(Continued)

*Primary Examiner* — Darryl J Collins
(74) *Attorney, Agent, or Firm* — NSIP Law

(57) ABSTRACT

An optical imaging system includes a first lens having positive refractive power, a second lens having negative refractive power, a third lens having negative refractive power, a fourth lens having a refractive power, a fifth lens having negative refractive power, and a sixth lens having a refractive power and a convex image-side surface. The first lens to the sixth lens are sequentially disposed from the object side to an imaging plane. An expression $0.7<TL/f<1.0$ is satisfied, where TL represents a distance from an object-side surface of the first lens to the imaging plane and f represents an overall focal length of the optical imaging system.

16 Claims, 10 Drawing Sheets

Related U.S. Application Data continuation of application No. 15/468,388, filed on Mar. 24, 2017, now Pat. No. 10,281,682.

(51) Int. Cl.
*G02B 9/60* (2006.01)
*G02B 9/04* (2006.01)
*H04M 1/02* (2006.01)

(56) References Cited

U.S. PATENT DOCUMENTS

| | | |
|---|---|---|
| 8,861,095 B2 | 10/2014 | Kubota et al. |
| 8,964,096 B2 | 2/2015 | Katou et al. |
| 9,223,118 B2 | 12/2015 | Mercado |
| 9,488,808 B1 | 11/2016 | Chen et al. |
| 2003/0002170 A1 | 1/2003 | Hayashide |
| 2003/0169508 A1 | 9/2003 | Ori |
| 2007/0201141 A1 | 8/2007 | Kato et al. |
| 2009/0067063 A1 | 3/2009 | Asami et al. |
| 2009/0067065 A1 | 3/2009 | Suzuki et al. |
| 2012/0092778 A1 | 4/2012 | Tsai et al. |
| 2013/0021678 A1 | 1/2013 | Tsai et al. |
| 2013/0176631 A1 | 7/2013 | Tsai et al. |
| 2013/0208178 A1 | 8/2013 | Park |
| 2013/0314804 A1 | 11/2013 | Kubota et al. |
| 2013/0342918 A1 | 12/2013 | Kubota et al. |
| 2014/0092271 A1 | 4/2014 | Katou et al. |
| 2014/0111876 A1 | 4/2014 | Tang et al. |
| 2014/0153113 A1 | 6/2014 | Tsai et al. |
| 2014/0198396 A1 | 7/2014 | Hsu et al. |
| 2014/0300975 A1 | 10/2014 | Tsai et al. |
| 2015/0029601 A1 | 1/2015 | Dror et al. |
| 2015/0109692 A1 | 4/2015 | Son |
| 2015/0116569 A1 | 4/2015 | Mercado |
| 2015/0138431 A1 | 5/2015 | Shin et al. |
| 2015/0168698 A1 | 6/2015 | Asami |
| 2016/0011398 A1 | 1/2016 | Tsai et al. |
| 2016/0103300 A1 | 4/2016 | Tang et al. |
| 2016/0124189 A1 | 5/2016 | Park |
| 2016/0124190 A1 | 5/2016 | Jung |
| 2016/0187622 A1* | 6/2016 | Huang ............... G02B 13/0045 359/713 |
| 2016/0259147 A1 | 9/2016 | Hsueh et al. |
| 2016/0274334 A1 | 9/2016 | Lee et al. |
| 2016/0313536 A1 | 10/2016 | Kubota et al. |
| 2016/0349485 A1 | 12/2016 | Teraoka |
| 2018/0224630 A1 | 8/2018 | Lee et al. |

FOREIGN PATENT DOCUMENTS

| | | |
|---|---|---|
| CN | 202886714 U | 4/2013 |
| CN | 202975455 U | 6/2013 |
| CN | 103197401 A | 7/2013 |
| CN | 103713382 A | 4/2014 |
| CN | 103926676 A | 7/2014 |
| CN | 104101987 A | 10/2014 |
| CN | 104597586 A | 5/2015 |
| CN | 104730684 A | 6/2015 |
| CN | 105158876 A | 12/2015 |
| CN | 105278079 A | 1/2016 |
| CN | 105319678 A | 2/2016 |
| CN | 105629441 A | 6/2016 |
| CN | 105807409 A | 7/2016 |
| CN | 105988184 A | 10/2016 |
| CN | 105988191 A | 10/2016 |
| CN | 105988200 A | 10/2016 |
| CN | 106154491 A | 11/2016 |
| CN | 106154504 A | 11/2016 |
| CN | 106199931 A | 12/2016 |
| JP | 2002-314767 A | 10/2002 |
| JP | 2003-43352 A | 2/2003 |
| JP | 2003-228002 A | 8/2003 |
| JP | 2009-294527 A | 12/2009 |
| JP | 2012-155223 A | 8/2012 |
| JP | 2013-25202 A | 2/2013 |
| JP | 2014-74742 A | 4/2014 |
| JP | 2016-537689 A | 12/2016 |
| KR | 10-2013-0092846 A | 8/2013 |
| KR | 10-1504034 B1 | 3/2015 |
| KR | 10-2016-0016931 A | 2/2016 |
| KR | 10-2017-0016714 A | 2/2017 |
| TW | I435136 B | 4/2014 |
| TW | I449948 B | 8/2014 |
| TW | 201614311 A | 4/2016 |
| TW | 201632935 A | 9/2016 |
| WO | WO 2015/065730 A1 | 5/2015 |

OTHER PUBLICATIONS

Korean Office Action dated Dec. 24, 2018 in corresponding Korean Patent Application No. 10-2016-0174946 (6 pages in English and 4 pages in Korean).

Korean Office Action dated Jun. 4, 2018, in corresponding Korean Application No. 10-2016-0174946 (7 pages in English, 5 pages in Korean).

Chinese Office Action dated Oct. 18, 2021, in Counterpart Chinese Patent Application No. 202010825759.9 (12 pages in English and 12 pages in Chinese).

Korean Office Action dated Dec. 7, 2022, in counterpart Korean Patent Application No. 10-2017-0169310 (5 pages in English, 3 pages in Korean).

\* cited by examiner

| | K | A | B | C | D | E | F | G | H | J |
|---|---|---|---|---|---|---|---|---|---|---|
| 1 | -0.37419 | 9.00841E-03 | 1.45468E-02 | -7.01545E-02 | 2.08971E-01 | -3.45130E-01 | 3.14981E-01 | -1.51595E-01 | 2.94765E-02 | |
| 2 | 0.00000 | 1.27767E-01 | -7.18061E-02 | -4.31197E-01 | 1.22938E+00 | -1.72430E+00 | 1.40732E+00 | -6.33795E-01 | 1.23514E-01 | |
| 3 | 0.00000 | 6.51550E-02 | 2.05012E-01 | -2.03786E+00 | 7.04735E+00 | -1.49254E+01 | 2.01493E+01 | -1.67268E+01 | 7.77158E+00 | -1.54417E+00 |
| 4 | -5.05092 | -2.77952E-02 | 5.22116E-01 | -4.18309E+00 | 1.90134E+01 | -5.48710E+01 | 9.89604E+01 | -1.07998E+02 | 6.52361E+01 | -1.67364E+01 |
| 6 | 0.00000 | 1.71022E-01 | -2.15784E-01 | 1.71670E+00 | -1.32981E+01 | 5.37404E+01 | -1.32731E+02 | 1.98024E+02 | -1.64431E+02 | 5.86914E+01 |
| 7 | -13.97443 | 2.54305E-01 | 1.15584E+00 | -1.78199E+01 | 1.57721E+02 | -8.63172E+02 | 2.93135E+03 | -6.02358E+03 | 6.85931E+03 | -3.32162E+03 |
| 8 | 0.41951 | -3.02525E-02 | -5.34947E-02 | 1.71146E-02 | -3.81293E-02 | 2.19500E-01 | -3.27202E-01 | 2.18076E-01 | -6.89698E-02 | 8.41816E-03 |
| 9 | -51.01777 | -1.10923E-01 | 4.23253E-01 | -9.90656E-01 | 1.22271E+00 | -9.09324E-01 | 4.23783E-01 | -1.22136E-01 | 1.99987E-02 | -1.42356E-03 |
| 10 | -15.85770 | -1.84732E-01 | 5.33933E-01 | -8.14156E-01 | 6.93267E-01 | -3.57056E-01 | 1.13309E-01 | -2.16230E-02 | 2.27767E-03 | -1.01980E-04 |
| 11 | 0.00000 | -1.53932E-01 | 1.97188E-01 | -1.54289E-01 | 5.51800E-02 | -6.62815E-02 | -6.54006E-03 | 2.31742E-03 | -3.45325E-04 | 1.98725E-05 |

FIG. 3

| | K | A | B | C | D | E | F | G | H | J |
|---|---|---|---|---|---|---|---|---|---|---|
| 1 | -0.32426 | 8.11796E-03 | 5.69306E-03 | -1.36130E-02 | 3.56367E-02 | -5.31492E-02 | 4.44012E-02 | -1.96048E-02 | 3.32412E-03 | |
| 2 | 0.00000 | 1.22203E-01 | -2.00352E-01 | 8.37260E-02 | 3.14530E-01 | -7.12515E-01 | 6.59468E-01 | -2.93296E-01 | 5.16972E-02 | |
| 3 | 0.00000 | 9.63973E-02 | -2.11518E-01 | 1.06560E-01 | 2.78245E-01 | -5.08326E-01 | 1.27809E-01 | 3.78739E-01 | -3.50798E-01 | 9.26739E-02 |
| 4 | -4.08552 | 8.96476E-03 | 2.70244E-02 | -5.95761E-01 | 2.52633E+00 | -6.03873E+00 | 8.71560E+00 | -7.51718E+00 | 3.59584E+00 | -7.40547E-01 |
| 6 | 0.00000 | 1.28311E-01 | -2.71717E-01 | 2.20204E-01 | -1.65348E+01 | 7.28691E+01 | -1.96398E+02 | 3.17054E+02 | -2.81420E+02 | 1.05583E+02 |
| 7 | -13.97443 | 1.89258E-01 | 2.46252E-01 | -3.42767E+00 | 2.27470E+01 | -9.27734E+01 | 2.34124E+02 | -3.56487E+02 | 3.00083E+02 | -1.07183E+02 |
| 8 | 0.41951 | -5.33030E-02 | 7.79022E-02 | -2.79989E-01 | 4.57728E-01 | -4.09869E-01 | 2.15227E-01 | -6.67765E-02 | 1.12756E-02 | -7.65187E-04 |
| 9 | -51.01777 | -5.75743E-02 | 1.90638E-01 | -3.70023E-01 | 3.68164E-01 | -2.20413E-01 | 8.27779E-02 | -1.91635E-02 | 2.48982E-03 | -1.37409E-04 |
| 10 | -15.85770 | -1.18310E-01 | 2.27971E-01 | -2.54736E-01 | 1.57680E-01 | -5.97032E-02 | 1.45250E-02 | -2.28227E-03 | 2.16597E-04 | -9.52666E-06 |
| 11 | 0.00000 | -1.00671E-01 | 1.02021E-01 | -7.72935E-02 | 3.82771E-02 | -1.34696E-02 | 3.31508E-03 | -5.16081E-04 | 4.35719E-05 | -1.45304E-06 |

FIG. 6

| | K | A | B | C | D | E | F | G | H | J |
|---|---|---|---|---|---|---|---|---|---|---|
| 1 | -0.36329 | 1.09130E-02 | 5.89538E-03 | -2.01400E-02 | 6.81008E-02 | -1.23253E-01 | 1.18632E-01 | -6.00798E-02 | 1.20577E-02 | |
| 2 | 0.00000 | 6.07322E-02 | -3.52197E-02 | -2.08328E-01 | 5.76888E-01 | -7.85032E-01 | 6.11611E-01 | -2.56879E-01 | 4.55584E-02 | |
| 3 | 0.00000 | 6.68232E-02 | -4.36248E-02 | 5.13050E-02 | -8.91155E-01 | 3.83962E+00 | -7.67203E+00 | 8.35140E+00 | -4.75208E+00 | 1.11146E+00 |
| 4 | 2.07108 | 1.95359E-02 | 1.90702E-01 | -1.21775E+00 | 5.25090E+00 | -1.49718E+01 | 2.85085E+01 | -3.54870E+01 | 2.63863E+01 | -9.05421E+00 |
| 6 | 0.00000 | 9.20386E-02 | -1.52630E-01 | 1.82269E+00 | -1.59789E+01 | 6.99341E+01 | -1.83875E+02 | 2.89783E+02 | -2.54235E+02 | 9.56729E+01 |
| 7 | 0.00000 | -1.57607E-01 | 9.22856E-01 | -3.63586E+00 | 9.44993E+00 | -1.52445E+01 | 1.39908E+01 | -8.23180E+00 | 4.73451E+00 | -1.87960E+00 |
| 8 | 0.00000 | -2.67267E-01 | 8.01567E-01 | -1.61087E+00 | 1.27762E+00 | 9.68975E+00 | -3.45838E+01 | 4.92139E+01 | -3.34031E+01 | 8.96870E+00 |
| 9 | 0.00000 | 7.97841E-03 | 2.32846E-01 | -1.02849E+00 | 6.07596E+00 | -2.02565E+01 | 4.40390E+01 | -5.92170E+01 | 4.39693E+01 | -1.37774E+01 |
| 10 | 0.00000 | 3.12342E-02 | -2.31773E-01 | 3.50204E-01 | -2.58399E-01 | 3.03634E-02 | 1.05190E-01 | -8.76153E-02 | 2.96516E-02 | -3.79612E-03 |
| 11 | 0.00000 | -2.30665E-02 | -7.22391E-02 | 1.00103E-01 | -1.19178E-01 | 1.06887E-01 | -6.31344E-02 | 2.28867E-02 | -4.64086E-03 | 4.02252E-04 |
| 12 | 80.60842 | -1.43302E-01 | 2.17490E-01 | -2.72299E-01 | 2.06365E-01 | -1.00885E-01 | 3.34595E-02 | -7.40872E-03 | 9.82880E-04 | -5.81424E-05 |
| 13 | 0.00000 | -1.44513E-01 | 1.47157E-01 | -1.31782E-01 | 8.33206E-02 | -3.72016E-02 | 1.13139E-02 | -2.17034E-03 | 2.32907E-04 | -1.05643E-05 |

FIG. 9

OPTICAL IMAGING SYSTEM

CROSS-REFERENCE TO RELATED APPLICATIONS

This application is a continuation of U.S. patent application Ser. No. 16/375,058 filed on Apr. 4, 2019, now U.S. Pat. No. 11,092,775 issued on Aug. 17, 2021, which is a continuation of U.S. patent application Ser. No. 15/468,388 filed on Mar. 24, 2017, now U.S. Pat. No. 10,281,682 issued May 7, 2019, which claims the benefit under 35 U.S.C. § 119(a) of Korean Patent Application No. 10-2016-0174946 filed on Dec. 20, 2016, in the Korean Intellectual Property Office, the entire disclosures of which are incorporated herein by reference for all purposes.

BACKGROUND

1. Field

The present disclosure relates to a telescopic optical imaging system including five or more lenses.

2. Description of Related Art

A telescopic optical system able to capture an image of a subject at long distance may have a significant size. For example, a ratio (TL/f) of a total length (TL) of the telescopic optical system to an overall focal length (f) of the telescopic optical system may be 1 or more. Therefore, it may be difficult to mount such a telescopic optical system in a small electronic product such as a mobile communications terminal.

SUMMARY

This Summary is provided to introduce a selection of concepts, in simplified form, that are further described below in the Detailed Description. This Summary is not intended to identify key features or essential features of the claimed subject matter, nor is it intended to be used as an aid in determining the scope of the claimed subject matter.

According to an aspect of the present disclosure, an optical imaging system includes a first lens group having a first group of lenses, wherein a foremost lens of the first group of lenses is a lens closest to an object side and comprises a positive refractive power. The optical imaging system also includes a second lens group having a second group of lenses, wherein a rearmost lens of the second group of lenses is a lens closest to an imaging plane and comprises convex surfaces. The first and second lens groups are sequentially disposed from the object side to an imaging plane. An expression TL/f1<2.0 is satisfied, where TL represents a distance from an object-side surface of the foremost lens to the imaging plane and f1 represents a focal length of the foremost lens.

The optical imaging system may include a foremost lens with a convex object-side surface. The optical imaging system can include another lens disposed adjacently to an image-side surface of the foremost lens, where the other lens has a negative refractive power. The optical imaging system may include a rearmost lens that has a refractive index higher than 1.6 and lower than 1.75.

The optical imaging system may satisfy the conditional expression 0.9 millimeters (mm)<d1G2G<1.7 mm, where d1G2G represents a distance from an image-side surface of a lens closest to the imaging plane among the lenses of the first lens group to an object-side surface of a lens closest to the object side among the lenses of the second lens group. The optical imaging system may satisfy the conditional expression −1.0<f1G/f2G<−0.2, where f1G represents a synthetic focal length of the first lens group and f2G represents a synthetic focal length of the second lens group. The optical imaging system may satisfy the conditional expression 0.3<tan θ<0.5, where θ represents half a field of view of the optical imaging system.

The optical imaging system may further include a first lens group that is made up of a first lens having a positive refractive power, a second lens having a negative refractive power, and a third lens having a negative refractive power. The optical imaging system may include a convex object-side surface of the third lens. The optical imaging system may further include a second lens group that is made up of a fourth lens having a negative refractive power and a fifth lens having a positive refractive power. The optical imaging system may include a concave object-side surface for the fourth lens.

Alternatively, the optical imaging system may further include a first lens group further made up of a first lens having a positive refractive power, a second lens having a negative refractive power, a third lens having a negative refractive power, and a fourth lens having a positive refractive power. In the alternative, the optical imaging system may further include a second lens group made up of a fifth lens having a negative refractive power and a sixth lens having a positive refractive power.

In another general aspect, an optical imaging system includes a first lens comprising a positive refractive power, a second lens comprising a negative refractive power, a third lens comprising a negative refractive power, a fourth lens comprising a negative refractive power, and a fifth lens comprising a positive refractive power. The first to fifth lenses are sequentially disposed from an object side. The optical imaging system satisfies the conditional expression 0.7<TL/f<1.0, where TL represents a distance from an object-side surface of the first lens to an imaging plane and f represents an overall focal length of the optical imaging system.

The optical imaging system may also satisfy the conditional expression −2.5<f/f2<−0.5, where f represents the overall focal length of the optical imaging system and f2 represents a focal length of the second lens. The optical imaging system can satisfy the conditional expression −3.5<f/f3<−0.4, where f represents the overall focal length of the optical imaging system and f3 represents a focal length of the third lens.

In another general aspect, an optical imaging system includes a first lens having a convex object-side surface along an optical axis, a second lens having a convex object-side surface and a concave image-side surface along the optical axis, a third lens having a concave image-side surface along the optical axis, a fourth lens having concave object-side and image-side surfaces along the optical axis, and a fifth lens having a convex object-side and image-side surfaces along the optical axis.

The optical imaging system may have a concave image-side surface of the first lens and the object-side surface of the third lens. The optical imaging system may have a convex image-side surface of the first lens and the object-side surface of the third lens.

BRIEF DESCRIPTION OF DRAWINGS

The above and other aspects, features, and advantages of the present disclosure will be more clearly understood from the following detailed description taken in conjunction with the accompanying drawings, in which:

FIG. 3 is a table listing aspherical characteristics of the optical imaging system illustrated in FIG. 1;

FIG. 6 is a table listing aspherical characteristics of the optical imaging system illustrated in FIG. 4;

FIG. 9 is a table listing aspherical characteristics of the optical imaging system illustrated in FIG. 7;

DETAILED DESCRIPTION

Figure 1:
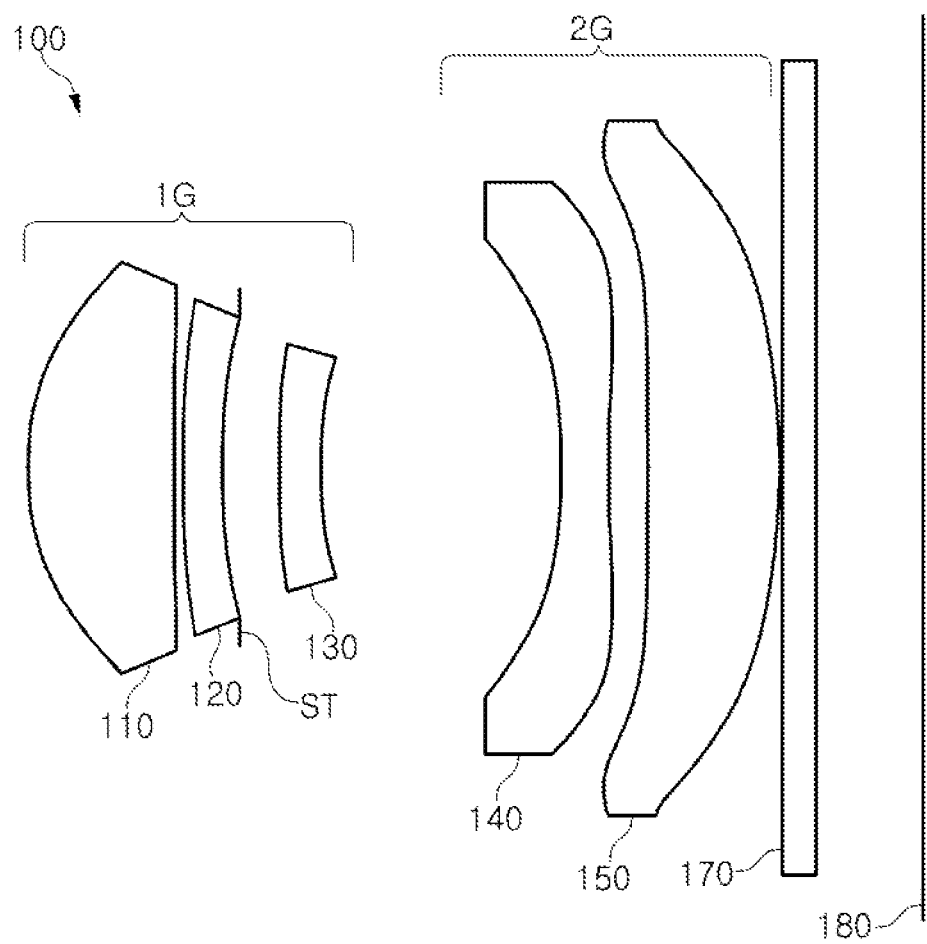
FIG. 1 is a view illustrating an optical imaging system according to a first example.

Hereinafter, embodiments of the present disclosure will now be described in detail with reference to the accompanying drawings. The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are well known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various components, regions, or sections, these components, regions, or sections are not to be limited by these terms. Rather, these terms are only used to distinguish one component, region, or section from another component, region, or section. Thus, a first component, region, or section referred to in examples described herein may also be referred to as a second component, region, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In accordance with examples, a first lens refers to a lens closest to an object or a subject from which an image is captured. A fifth or sixth lens is a lens closest to an imaging plane or an image sensor. In embodiments, all radii of curvature of lenses, thicknesses, a distance from an object-side surface of a first lens to an imaging plane (OAL), a half diagonal length of the imaging plane (IMG HT), and focal lengths of each lens are indicated in millimeters (mm). A person skilled in the relevant art will appreciate that other units of measurement may be used. Further, in embodiments, all radii of curvature, thicknesses, OALs (optical axis distances from the first surface of the first lens to the image sensor), a distance on the optical axis between the stop and the image sensor (SLs), image heights (IMGHs) (image heights), and back focus lengths (BFLs) of the lenses, an overall focal length of an optical system, and a focal length of each lens are indicated in millimeters (mm). Further, thicknesses of lenses, gaps between the lenses, OALs, TLs, SLs are distances measured based on an optical axis of the lenses.

A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

In accordance with illustrative examples, the embodiments described of the optical system include five or six lenses with a refractive power. However, the number of lenses in the optical system may vary, for example, between two to six lenses, while achieving the various results and benefits described below. Also, although each lens is described with a particular refractive power, a different refractive power for at least one of the lenses may be used to achieve the intended result.

The present disclosure provides an optical imaging system capable of capturing an image of a subject at a long distance and being mounted in a small terminal. The optical imaging system may include two lens groups. For example, the optical imaging system includes a first lens group and a second lens group.

The first lens group includes a plurality of lenses. In embodiments, the first lens group includes three or four lenses.

In an embodiment of the former case, the first lens group includes a first lens having a positive refractive power, a second lens having a negative refractive power, and a third lens having a negative refractive power. An object-side surface of the first lens is convex, an object-side surface of the second lens is convex and an image-side surface of the second lens is concave. An image-side surface of the third lens is concave.

In an embodiment of the latter case, the first lens group includes a first lens having a positive refractive power, a second lens having a negative refractive power, a third lens having a negative refractive power, and a fourth lens having a positive refractive power. An object-side surface of the first lens is convex. An object-side surface of the second lens is convex and an image-side surface of the second lens is concave. Both surfaces of the third lens are concave and both surfaces of the fourth lens are convex.

The first lens group includes aspherical lenses. For example, at least one surface of all of lenses constituting the first lens group are aspherical. The first lens group may include plastic lenses. As an example, all of the lenses constituting the first lens group are formed of plastic.

The second lens group includes a plurality of lenses. In an embodiment, the second lens group includes lenses having a negative refractive power and lenses having a positive refractive power. Here, both surfaces of the lenses having a negative refractive power are concave, and both surfaces of the lenses having a positive refractive power are convex.

The second lens group includes aspherical lenses. For example, at least one surface of all of lenses constituting the second lens group are aspherical. The second lens group may include plastic lenses. As an example, all of the lenses constituting the second lens group are formed of plastic.

In the optical imaging system, the aspherical surface of each lens may be represented by the following Equation 1:

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}.$$  [Equation 1]

Here, c represents an inverse of a radius of curvature of the lens, k represents a conic constant, r represents a distance from a certain point on an aspherical surface of the lens to an optical axis, A to J represent aspherical constants, and Z (or SAG) represents a distance between the certain point on the aspherical surface of the lens at the distance r and a tangential plane meeting the apex of the aspherical surface of the lens.

The optical imaging system further includes a filter, an image sensor, and a stop. The filter is disposed between a rearmost lens of the second lens group and the image sensor. The filter blocks a partial wavelength of light so that a clear image may be implemented. For example, the filter is configured to filter an infrared wavelength of light.

The image sensor may form an imaging plane. For example, a surface of the image sensor forms the imaging plane. The stop may be disposed in order to adjust an amount of light incident to the lenses. For example, the stop is disposed between the second and third lenses.

The optical imaging system may satisfy any one or any combination of any two or more of the following Conditional Expressions:

$0.7 < TL/f < 1.0$ [Conditional Expression 1]

$0.9 < d1G2G < 1.7$ [Conditional Expression 2]

$-2.5 < f/f2 < -0.5$ [Conditional Expression 3]

$-3.5 < f/f3 < -0.4$ [Conditional Expression 4]

$1.6 < Ndi < 1.75$ [Conditional Expression 5]

$0.3 < \tan \theta < 0.5$ [Conditional Expression 6]

$-1.0 < f1G/f2G < -0.2.$ [Conditional Expression 7]

Here, TL represents a distance from the object-side surface of the first lens to the imaging plane, f represents an overall focal length of the optical imaging system, d1G2G represents a distance from an image-side surface of a lens closest to the imaging plane among the lenses of the first lens group to an object-side surface of a lens closest to an object side among the lenses of the second lens group, f2 represents a focal length of the second lens, f3 represents a focal length of the third lens, Ndi represents a refractive index of a lens closest to the imaging plane, θ represents half a field of view of the optical imaging system, f1G represents a synthetic focal length of the first lens group, and f2G represents a synthetic focal length of the second lens group.

Conditional Expression 1 is a parametric ratio for miniaturizing the optical imaging system. For example, in a case in which TL/f is outside of an upper limit value of Conditional Expression 1, it may be difficult to miniaturize the optical imaging system, thereby making it difficult to mount the optical imaging system in a mobile communications terminal. In a case in which TL/f is outside of a lower limit value of Conditional Expression 1, it may be difficult to manufacture the optical imaging system.

Conditional Expression 2 is a parameter for implementing a telescopic optical system. For example, in a case in which d1G2G is outside of a lower limit value of Conditional Expression 2, a focal length of the optical imaging system may be short, thereby making it difficult to mount the optical imaging system in a telescopic camera module. In a case in which d1G2G is outside of an upper limit value of Conditional Expression 2, a total length (TL) of the optical imaging system may be large, making it difficult to sufficiently miniaturize the optical imaging system.

Conditional Expression 3 is a parametric ratio involving the second lens in order to implement a high-resolution optical imaging system. For example, in a case in which f/f2 is outside of a numerical range of Conditional Expression 3, the second lens may increase astigmatism of the optical imaging system, causing deterioration of an image.

Conditional Expression 4 is a parametric ratio for the third lens in order to implement a high-resolution optical imaging system. For example, in a case in which f/f3 is outside of a numerical range of Conditional Expression 4, the third lens may increase astigmatism of the optical imaging system, causing deterioration of an image.

Conditional Expression 5 is a parameter of the lens closest to the imaging plane in order to implement a high-resolution optical imaging system. For example, in a case in which Ndi satisfies a numerical range of Conditional Expression 5, the lens closest to the imaging plane may have a low Abbe number of 26 or less, which is advantageous for correction of astigmatism, longitudinal chromatic aberration, and magnification aberration.

Conditional Expression 6 indicates a range of a field of view for implementing a telescopic optical imaging system. Conditional Expression 7 indicates an appropriate focal ratio between the first lens group (for correcting aberration of the optical imaging system) and the second lens group (for correcting a curve of the imaging plane).

Next, optical imaging systems according to several embodiments will be described. First, an optical imaging system according to a first embodiment will be described with reference to FIG. 1. An optical imaging system 100 includes a first lens group 1G and a second lens group 2G.

The first lens group 1G includes a first lens 110, a second lens 120, and a third lens 130. The first lens 110 has a positive refractive power. Both surfaces of lens 110 are convex. The second lens 120 has a negative refractive power. An object-side surface of lens 120 is convex and an image-side surface of lens 120 is concave. The third lens 130 has a negative refractive power. An object-side surface of lens 130 is convex and an image-side surface of lens 130 is concave.

The second lens group 2G includes a fourth lens 140 and a fifth lens 150. The fourth lens 140 has a negative refractive power. Both surfaces of lens 140 are concave. In addition, an inflection point is formed on an image-side surface of fourth lens 140. For example, the image-side surface of the fourth lens 140 is concave in the vicinity of an optical axis and is convex at an edge. The fifth lens 150 has a positive refractive power. Both surfaces of lens 150 are convex. In addition, an inflection point is formed on an object-side surface of the fifth lens 150.

The optical imaging system 100 further includes a filter 170, an image sensor 180, and a stop ST. Filter 170 is disposed between fifth lens 150 and image sensor 180. Stop ST is disposed between second lens 120 and third lens 130.

Figure 2:
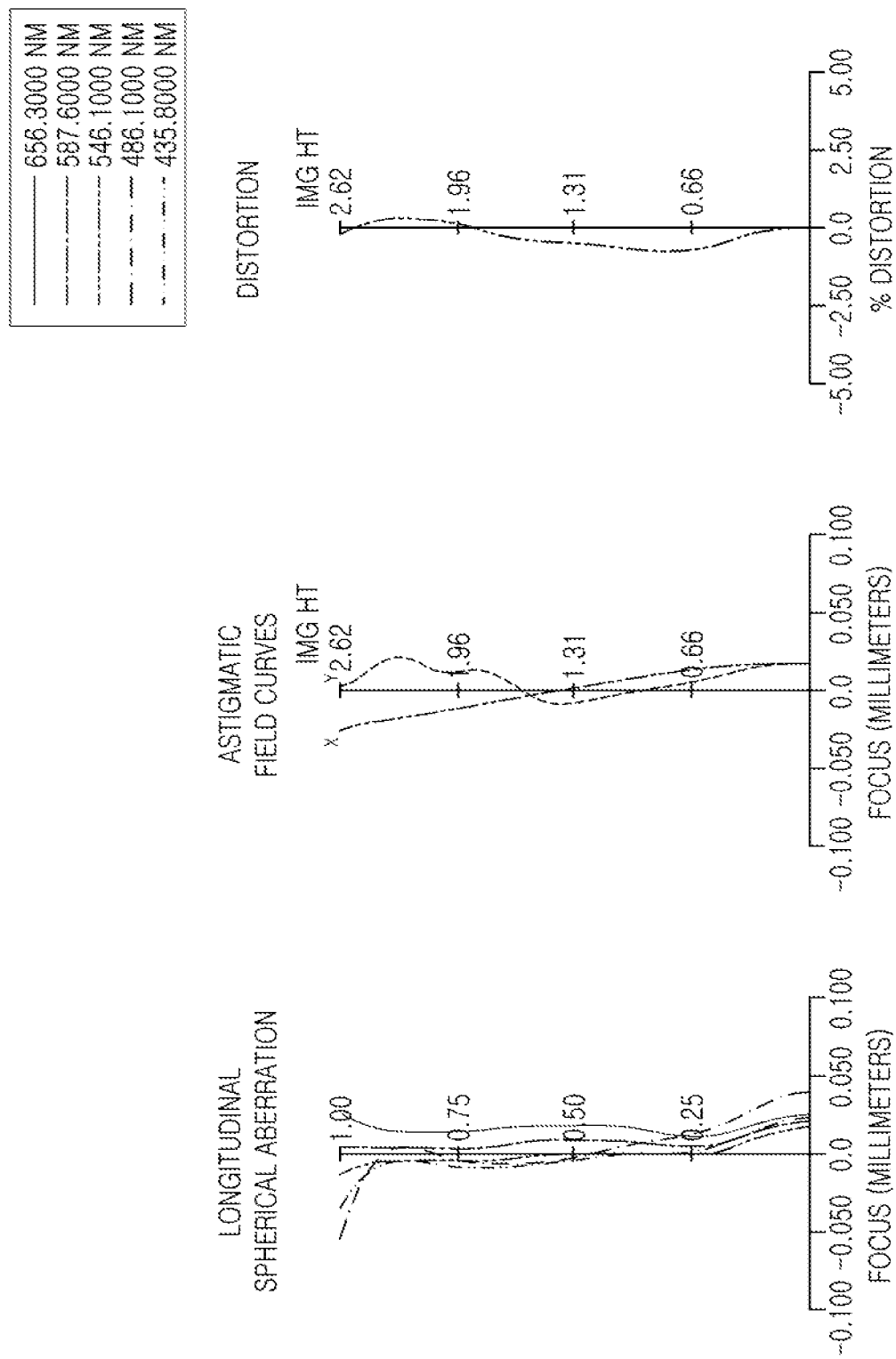
FIG. 2 is a set of graphs representing aberration curves of the optical imaging system illustrated in FIG. 1.

The optical imaging system configured as described above exhibits aberration characteristics as illustrated by the graphs in FIG. 2. FIG. 3 is a table listing aspherical characteristics of optical imaging system 100 according to an embodiment. Characteristics of the lenses of optical imaging system 100 are listed in Table 1.

TABLE 1

First Example

| Θ = Surface No. | 23.50 | f = Radius of Curvature | 6.000 Thickness/ Distance | TL = Index | 5.285 Abbe No. | Focal length |
|---|---|---|---|---|---|---|
| S0 | Stop | infinity | −1.2520 | | | |
| S1 | First Lens | 1.4800 | 0.8550 | 1.544 | 56.100 | 2.650 |
| S2 | | −49.33 | 0.0500 | | | |
| S3 | Second Lens | 6.850 | 0.2390 | 1.661 | 20.300 | −7.390 |
| S4 | | 2.8300 | 0.3420 | | | |
| S5 | Third Lens | 21.020 | 0.2400 | 1.650 | 21.500 | −7.590 |
| S6 | | 4.0100 | 1.4040 | | | |
| S7 | Fourth Lens | −3.3300 | 0.2900 | 1.544 | 56.100 | −4.400 |
| S8 | | 8.8800 | 0.2170 | | | |
| S9 | Fifth Lens | 30.1800 | 0.7700 | 1.650 | 21.500 | 11.880 |
| S10 | | −10.4300 | 0.0200 | | | |
| S11 | Filter | infinity | 0.2100 | 1.523 | 39.100 | |
| S12 | | infinity | 0.6480 | | | |
| S13 | Imaging Plane | | 0.0000 | | | |

Figure 4:
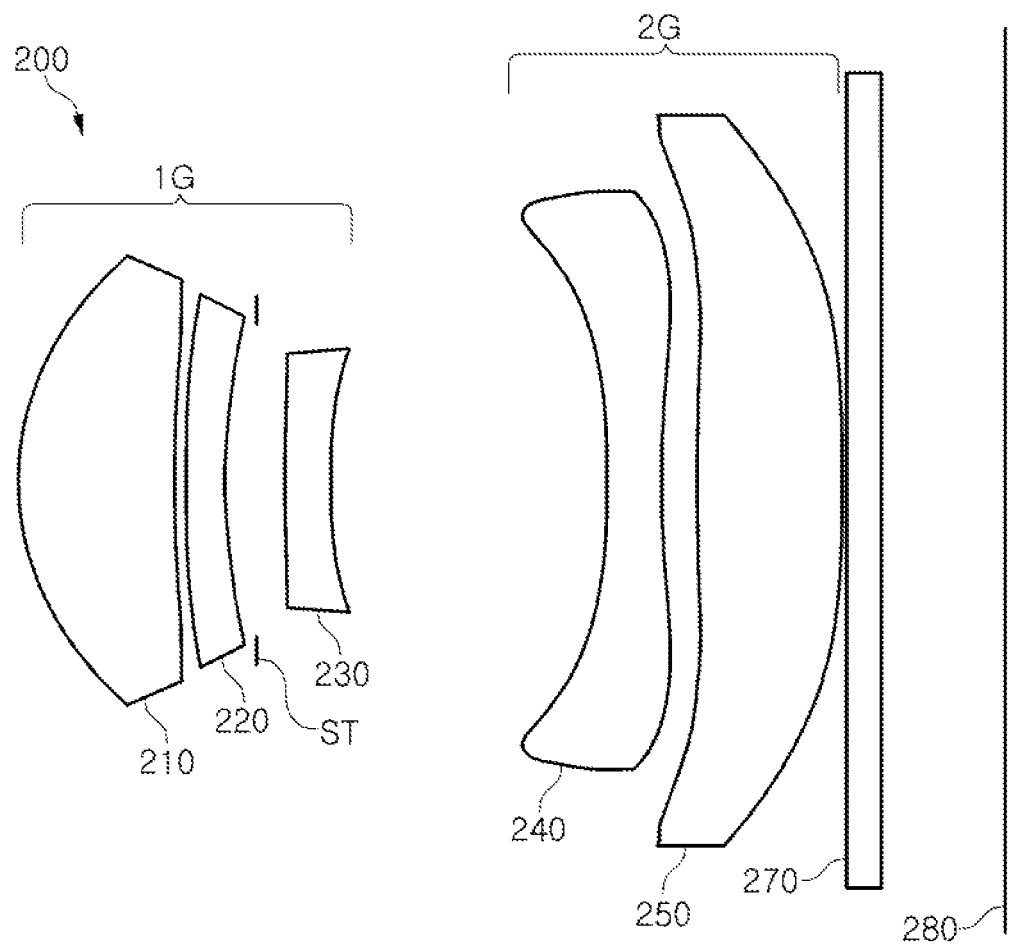
FIG. 4 is a view illustrating an optical imaging system according to a second example.

An optical imaging system according to a second embodiment will be described with reference to FIG. 4. An optical imaging system 200 includes a first lens group 1G and a second lens group 2G.

The first lens group 1G includes a first lens 210, a second lens 220, and a third lens 230. The first lens 210 has a positive refractive power. An object-side surface of lens 210 is convex and an image-side surface of lens 210 is concave. The second lens 220 has a negative refractive power. An object-side surface of lens 220 is convex and an image-side surface of lens 220 is concave. The third lens 230 has a negative refractive power. Both surfaces of lens 230 are concave.

The second lens group 2G includes a fourth lens 240 and a fifth lens 250. The fourth lens 240 has a negative refractive power. Both surfaces of lens 240 are concave. In addition, an inflection point is formed on an image-side surface of fourth lens 240. For example, the image-side surface of the fourth lens 240 is concave in the vicinity of an optical axis and is convex at an edge. The fifth lens 250 has a positive refractive power. Both surfaces of lens 250 are convex. In addition, an inflection point is formed on an object-side surface of fifth lens 250.

The optical imaging system 200 further includes a filter 270, an image sensor 280, and a stop ST. Filter 270 is disposed between fifth lens 250 and image sensor 280. Stop ST is disposed between second lens 220 and third lens 230.

Figure 5:
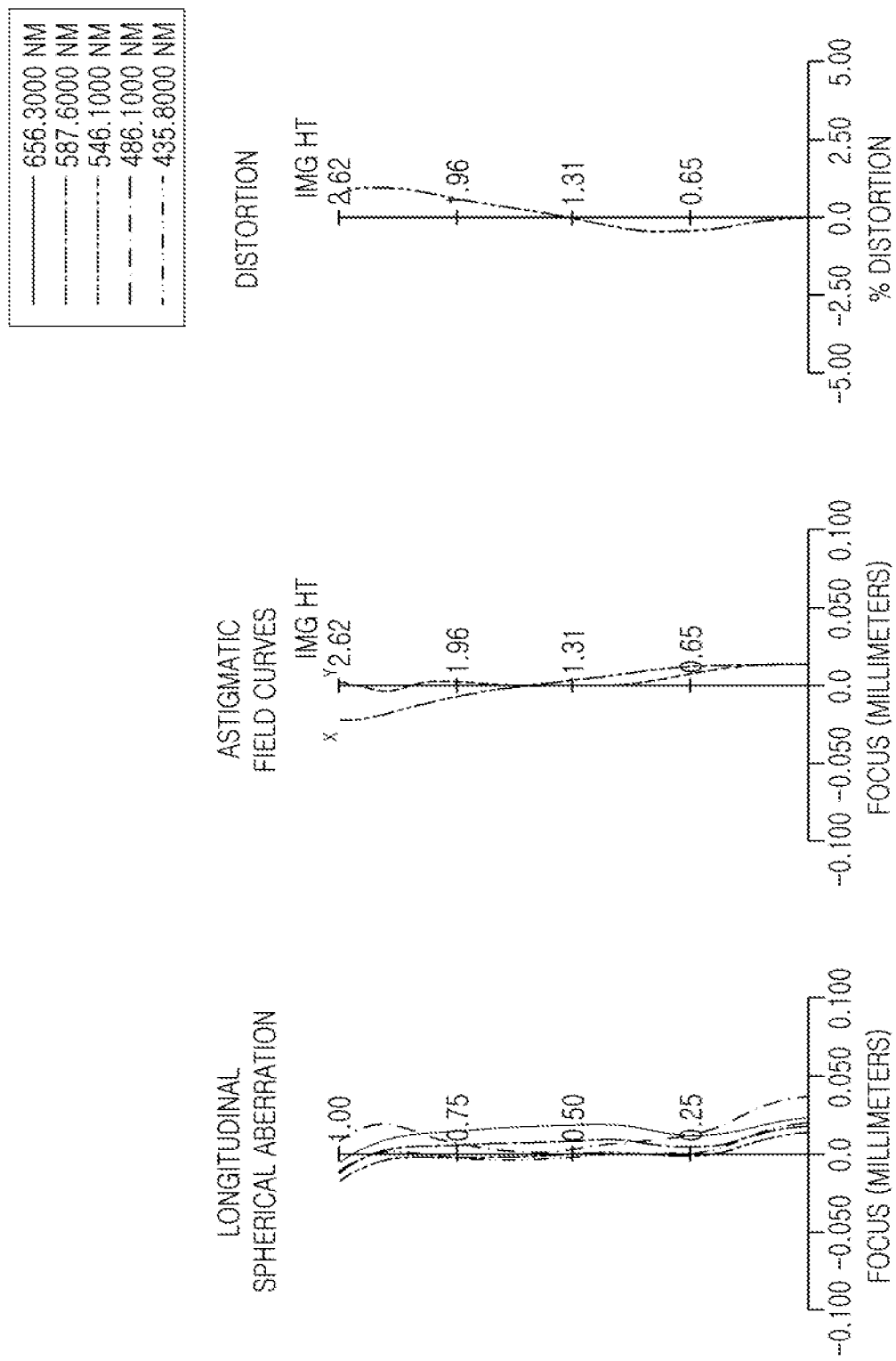
FIG. 5 is a set of graphs representing aberration curves of the optical imaging system illustrated in FIG. 4.

The optical imaging system configured as described above exhibits aberration characteristics as illustrated by the graphs in FIG. 5. FIG. 6 is a table listing aspherical characteristics of the optical imaging system according to an embodiment. Characteristics of the lenses of optical imaging system 200 are listed in Table 2.

TABLE 2

Second Example

| Θ = Surface No. | 21.48 | f = Radius of Curvature | 6.630 Thickness/ Distance | TL = Index | 5.844 Abbe No. | Focal length |
|---|---|---|---|---|---|---|
| S0 | Stop | | −1.3370 | | | |
| S1 | First Lens | 1.5800 | 0.9320 | 1.544 | 56.100 | 2.930 |
| S2 | | 113.01 | 0.0500 | | | |
| S3 | Second Lens | 7.690 | 0.2400 | 1.661 | 20.300 | −8.940 |
| S4 | | 3.3200 | 0.3680 | | | |
| S5 | Third Lens | −33.560 | 0.2640 | 1.650 | 21.500 | −7.560 |
| S6 | | 5.8500 | 1.6330 | | | |
| S7 | Fourth Lens | −4.9900 | 0.3200 | 1.544 | 56.100 | −4.440 |
| S8 | | 4.8200 | 0.2110 | | | |
| S9 | Fifth Lens | 9.6100 | 0.8550 | 1.650 | 21.500 | 9.220 |
| S10 | | −15.8200 | 0.0220 | | | |
| S11 | Filter | infinity | 0.2100 | 1.523 | 39.100 | |
| S12 | | infinity | 0.7490 | | | |
| S13 | Imaging Plane | infinity | −0.0100 | | | |

Figure 7:
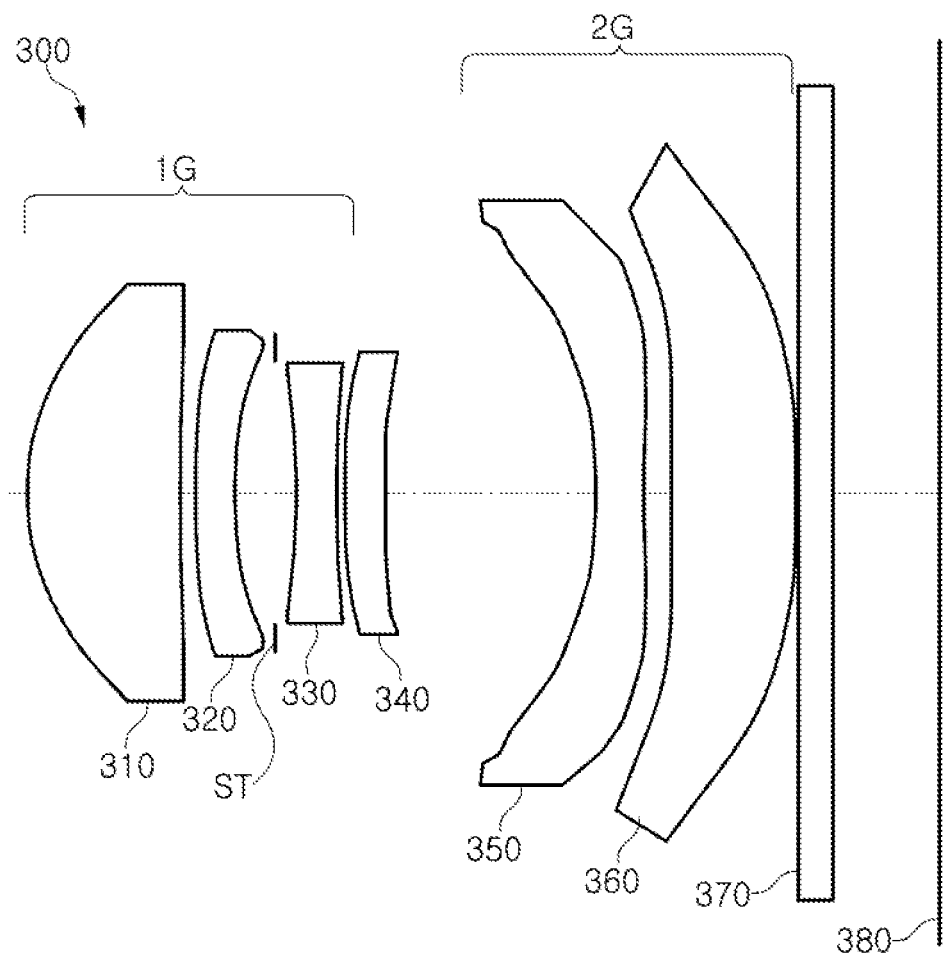
FIG. 7 is a view illustrating an optical imaging system according to a third example.

An optical imaging system according to a third embodiment will be described with reference to FIG. 7. An optical imaging system 300 includes a first lens group 1G and a second lens group 2G.

The first lens group 1G includes a first lens 310, a second lens 320, a third lens 330, and a fourth lens 340. The first lens 310 has a positive refractive power. An object-side surface of lens 310 is convex and an image-side surface of lens 310 is concave. The second lens 320 has a negative refractive power. An object-side surface of lens 320 is convex and an image-side surface of lens 320 is concave. The third lens 330 has a negative refractive power. Both surfaces of lens 330 are concave. The fourth lens 340 has a positive refractive power. Both surfaces of lens 340 are convex.

The second lens group 2G includes a fifth lens 350 and a sixth lens 360. The fifth lens 350 has a negative refractive power. Both surfaces of lens 350 are concave. In addition, an inflection point is formed on an image-side surface of fifth lens 350. For example, the image-side surface of fifth lens 350 is concave in the vicinity of an optical axis and is convex at an edge. The sixth lens 360 has a positive refractive power. Both surfaces of lens 360 are convex. In addition, an inflection point is formed on an object-side surface of sixth lens 360.

The optical imaging system 300 further includes a filter 370, an image sensor 380, and a stop ST. Filter 370 is disposed between sixth lens 360 and image sensor 380. Stop ST is disposed between second lens 320 and third lens 330.

Figure 8:
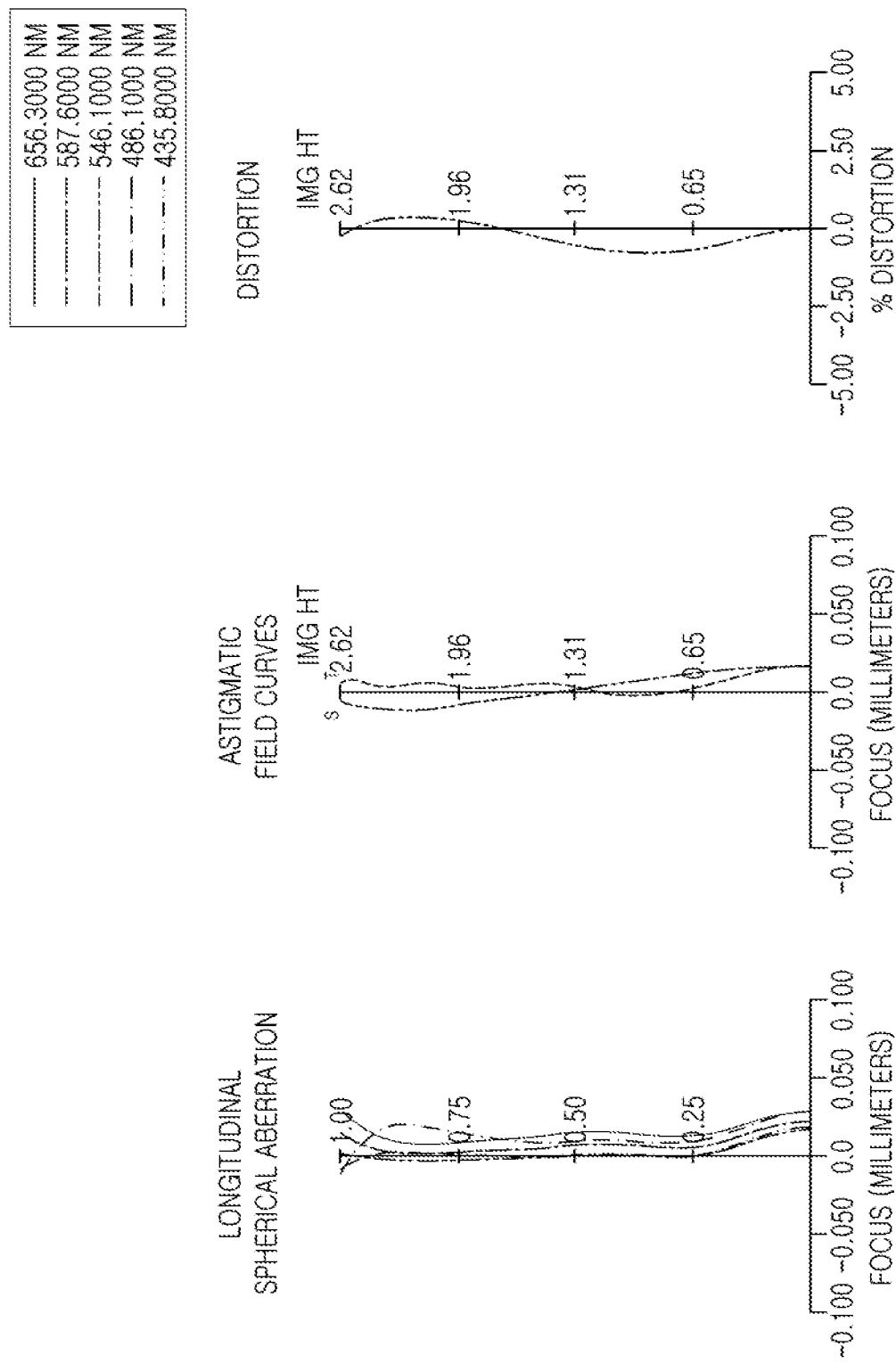
FIG. 8 is a set of graphs representing aberration curves of the optical imaging system illustrated in FIG. 7.

The optical imaging system configured as described above exhibits aberration characteristics as illustrated by the graphs in FIG. 8. FIG. 9 is a table listing aspherical characteristics of the optical imaging system according to an embodiment. Characteristics of the lenses of optical imaging system 300 are listed in Table 3.

TABLE 3

Third Example

| Surface No. | Θ = 23.71 | f = Radius of Curvature | 6.000 Thickness/ Distance | TL = Index | 5.387 Abbe No. | Focal length |
|---|---|---|---|---|---|---|
| S0 | Stop | | −1.4350 | | | |
| S1 | First Lens | 1.4700 | 0.9050 | 1.544 | 56.100 | 2.720 |
| S2 | | 109.11 | 0.0870 | | | |
| S3 | Second Lens | 5.770 | 0.2400 | 1.661 | 20.300 | −7.500 |
| S4 | | 2.6400 | 0.3590 | | | |
| S5 | Third Lens | −4.320 | 0.2400 | 1.650 | 21.500 | −3.740 |
| S6 | | 5.8600 | 0.0500 | | | |
| S7 | Fourth Lens | 4.3800 | 0.2400 | 1.650 | 21.500 | 6.650 |
| S8 | | −2000.0000 | 1.2490 | | | |
| S9 | Fifth Lens | −2.7300 | 0.2900 | 1.544 | 56.100 | −4.240 |
| S10 | | 16.0800 | 0.1630 | | | |
| S11 | Sixth Lens | 17.6000 | 0.7270 | 1.650 | 21.500 | 11.540 |
| S12 | | −13.1200 | 0.0200 | | | |
| S13 | Filter | infinity | 0.2100 | 1.523 | 39.100 | |
| S14 | | infinity | 0.6070 | | | |
| S15 | Imaging Plane | infinity | 0.0000 | | | |

Table 4 represents values of Conditional Expressions of the optical imaging systems according to the first to third embodiments.

TABLE 4

| Conditional Expression | 1st Example | 2nd Example | 3rd Example |
|---|---|---|---|
| TL/f | 0.881 | 0.881 | 0.898 |
| d1G2G | 1.404 | 1.633 | 1.249 |
| f/f2 | −0.812 | −0.742 | −0.800 |
| f/f3 | −0.790 | −0.877 | −1.604 |
| Ndi | 1.650 | 1.650 | 1.650 |
| tanΘ | 0.435 | 0.394 | 0.439 |
| f1G/f2G | −0.614 | −0.557 | −0.649 |

Figure 10:
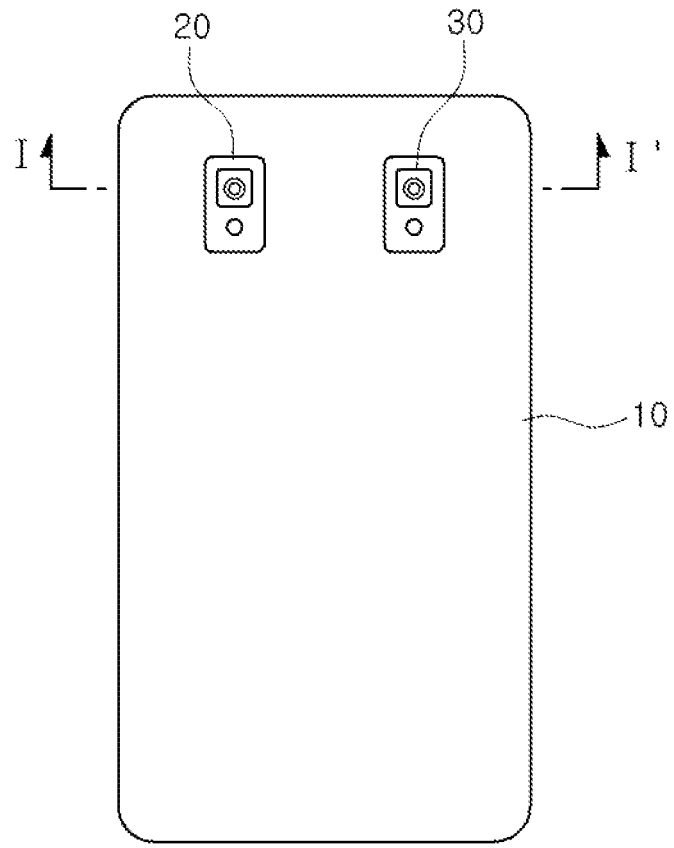
FIG. 10 is a rear view illustrating a mobile communications terminal in which an optical imaging system according to an embodiment in the present disclosure is mounted.
Figure 11:
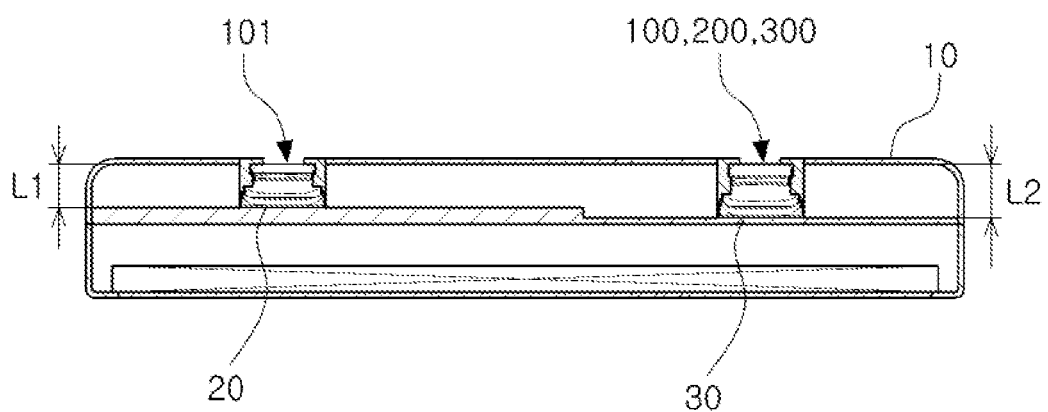
FIG. 11 is a cross-sectional view illustrating the mobile communications terminal illustrated in FIG. 10.

Next, a mobile communications terminal in which an optical imaging system according to an embodiment in the present disclosure is mounted will be described with reference to FIGS. 10 and 11.

A mobile communications terminal 10 includes a plurality of camera modules 20 and 30. A first camera module 20 includes a first optical imaging system 101 configured to capture an image of a subject positioned at a short distance, and a second camera module 30 includes a second optical imaging system 100, 200, or 300 configured to capture an image of a subject positioned at a long distance.

The first optical imaging system 101 includes lenses. For example, the first optical imaging system 101 includes four or more lenses. The first optical imaging system 101, as a whole, is configured to capture images of objects positioned at a short distance. As an example, the first optical imaging system 101 has a wide field of view of 50 degrees or more, and a ratio (TL/f) of a total length (TL) of the first optical imaging system to an overall focal length (f) of the first optical imaging system is 1.0 or more.

The second optical imaging system 100, 200, or 300 includes a plurality of lenses. For example, the second optical imaging system 100, 200, or 300 includes six lenses. The second optical imaging system 100, 200, or 300 is any one of the optical imaging systems according to the first to third embodiments described above. The second optical imaging system 100, 200, or 300 is configured to capture an image of an object positioned at a long distance. As an example, the second optical imaging system 100, 200, or 300 has a field of view of 50 degrees or less, and a ratio (TL/f) of a total length (TL) of the second optical imaging system to an overall focal length (f) of the second optical imaging system is less than 1.0.

The first optical imaging system 101 and the second optical imaging system 100, 200, or 300 may have substantially the same size. In an embodiment, a total length L1 of the first optical imaging system 101 is substantially the same as a total length L2 of the second optical imaging system 100, 200, or 300. Alternatively in another embodiment, a ratio (L1/L2) of a total length L1 of the first optical imaging system 101 to a total length L2 of the second optical imaging system 100, 200, or 300 may be 0.8 to 1.0. In yet another alternative embodiment, a ratio (L2/h) of the total length L2 of the second optical imaging system 100, 200, or 300 to a thickness h of the mobile communications terminal 10 may be 0.8 or less.

As set forth above, according to the embodiments in the present disclosure, an optical imaging system capable of capturing an image of a subject at a long distance and being mounted in a small terminal may be implemented.

While embodiments have been shown and described above, it will be apparent after an understanding of the disclosure of this application that modifications and variations could be made without departing from the scope of the present application as defined by the appended claims.

What is claimed is:

1. An optical imaging system, comprising:
a first lens comprising positive refractive power;
a second lens comprising negative refractive power;
a third lens comprising negative refractive power;
a fourth lens comprising a refractive power;
a fifth lens comprising negative refractive power; and
a sixth lens comprising a refractive power and a convex image-side surface,
wherein the first lens to the sixth lens are sequentially disposed from the object side to an imaging plane,
wherein an expression 0.7<TL/f<1.0 is satisfied, where TL represents a distance from an object-side surface of the first lens to the imaging plane and f represents an overall focal length of the optical imaging system, and
wherein a radius of curvature of an object-side surface of the third lens is greater than a radius of curvature of an image-side surface of the sixth lens.

2. The optical imaging system of claim 1, wherein the first lens has a convex object-side surface.

3. The optical imaging system of claim 1, wherein the second lens has a convex object-side surface.

4. The optical imaging system of claim 1, wherein the second lens has a concave image-side surface.

5. The optical imaging system of claim 1, wherein the third lens has a concave image-side surface.

6. The optical imaging system of claim 1, wherein the fourth lens has a convex object-side surface.

7. The optical imaging system of claim 1, wherein the fourth lens has a convex image-side surface.

8. The optical imaging system of claim 1, wherein the fourth lens has positive refractive power.

9. The optical imaging system of claim 1, wherein the fifth lens has a concave object-side surface.

10. The optical imaging system of claim 1, wherein the fifth lens has a concave image-side surface.

11. The optical imaging system of claim 1, wherein the sixth lens has a convex object-side surface.

12. The optical imaging system of claim 1, wherein an expression $0.3<\tan\theta<0.5$ is satisfied, where $\theta$ represents half a field of view of the optical imaging system.

13. The optical imaging system of claim 1, wherein an expression $-2.5<f/f2<-0.5$ is satisfied, where f2 represents a focal length of the second lens.

14. The optical imaging system of claim 1, wherein an expression $-3.5<f/f3<-0.4$ is satisfied, where f3 represents a focal length of the third lens.

15. An optical imaging system, comprising:
a first lens comprising positive refractive power;
a second lens comprising negative refractive power;
a third lens comprising negative refractive power;
a fourth lens comprising a refractive power and a convex object-side surface;
a fifth lens comprising negative refractive power; and
a sixth lens comprising a refractive power and a convex image-side surface,
wherein the first lens to the sixth lens are sequentially disposed from the object side to an imaging plane, and
wherein an expression $0.7<TL/f<1.0$ is satisfied, where TL represents a distance from an object-side surface of the first lens to the imaging plane and f represents an overall focal length of the optical imaging system.

16. An optical imaging system, comprising:
a first lens comprising positive refractive power;
a second lens comprising negative refractive power;
a third lens comprising negative refractive power;
a fourth lens comprising a refractive power;
a fifth lens comprising negative refractive power and a concave image-side surface; and
a sixth lens comprising a refractive power and a convex image-side surface,
wherein the first lens to the sixth lens are sequentially disposed from the object side to an imaging plane, and
wherein an expression $0.7<TL/f<1.0$ is satisfied, where TL represents a distance from an object-side surface of the first lens to the imaging plane and f represents an overall focal length of the optical imaging system.

* * * * *